United States Patent Office 3,697,460
Patented Oct. 10, 1972

3,697,460
SUBSTITUTED ESTERS OF PHENYL ACETIC ACIDS
Rolf Denss, Basel, Switzerland, Niels Clauson-Kaas, Farum, Denmark, and Franz Ostermayer, Riehen, Switzerland, assignors to Ciba-Geigy Corporation, Ardsley, N.Y.
No Drawing. Filed Apr. 22, 1969, Ser. No. 818,408
Claims priority, application Switzerland, Apr. 29, 1968, 6,377/68
Int. Cl. C07d 27/24
U.S. Cl. 260—247.2 B       11 Claims

ABSTRACT OF THE DISCLOSURE

Substituted [p-(1-pyrryl)-phenyl]-acetic acid aminoalkyl esters and pharmaceutically acceptable acid addition salts thereof have analgesic and anti-inflammatory activity; the compounds are active ingredients of pharmaceutical compositions and are useful for alleviating pain and treating inflammatory diseases in mammals: an illustrative embodiment is [p-(1-pyrryl)-phenyl]-acetic acid [3-(1-pyrrolidinyl)-propyl]-ester.

DETAILED DESCRIPTION

The present invention concerns substituted esters of phenyl acetic acids and pharmaceutically acceptable acid addition salts thereof, pharmaceutical compositions containing these compounds and methods of alleviating pain and treating inflammatory diseases in mammals by administering them.

More particularly, the present invention concerns substiuted [p-(1-pyrryl)-phenyl]-acetic acid aminoalkyl esters of the formula

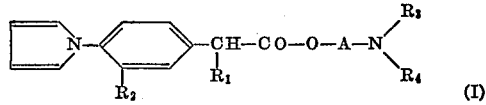

(I)

wherein
$R_1$ is hydrogen, methyl or ethyl,
$R_2$ is hydrogen or halogen up to the atomic number 35,
$R_3$ and $R_4$ independent of each other are alkyl having at most 4 carbon atoms, or together with the adjacent nitrogen atom form a polymethyleneimino group having from 5 to 7 ring members or the morpholino group, and
A is alkylene having 2 or 3 carbon atoms with at least 2 carbon atoms between the oxygen and the nitrogen atom;
and the pharmaceutically acceptable acid addition salts thereof.

In the compounds of Formula I and the corresponding starting materials mentioned below, $R_2$ as halogen up to the atomic number 35 can be fluoro, bromo and particularly chloro. $R_3$ and $R_4$ as lower alkyl with at most 4 carbon atoms can be the same or different, e.g. methyl, ethyl, n-propyl, isopropyl, n-butyl or isobutyl. $R_3$ and $R_4$ together with the adjacent nitrogen can also form a polymethyleneimino group having from 5 to 7 ring members such as the 1-pyrrolidinyl, piperidino or hexahydro-1H-azepine-1-yl group. The group A as an alkylene group can be ethylene, propylene and trimethylene.

A preferred class are compounds of Formula I wherein $R_1$ is hydrogen or methyl, $R_2$ is hydrogen or chloro, $R_3$ and $R_4$ independent of each other are methyl or together with the adjacent nitrogen form the pyrrolidinyl or the morpholino group, and A is as defined in Formula I, as well as the pharmaceutically acceptable acid addition salts thereof.

Preferred members of this class are the following compounds:
[p-(1-pyrryl)-phenyl]-acetic acid-[3-(1-pyrrolidinyl)-propyl]ester;
[p-(1-pyrryl)-phenyl]-acetic acid-2-morpholinoethyl ester;
[p-(1-pyrryl)-phenyl]-acetic acid-3-(dimethylamino)-propyl ester;
2-[p-(1-pyrryl)-phenyl]-propionic acid-2-(dimethylamino)ethyl ester;
2-[3-chloro-4-(1-pyrryl)-phenyl]-propionic acid-2-(dimethylamino)-ethyl ester;
[3-chloro-4-(1-pyrryl)-phenyl]-acetic acid-2-(dimethylamino)ethyl ester;
[p-(1-pyrryl)-phenyl]-acetic acid-2-(dimethylamino)-1-methylethyl ester;
[p-(1-pyrryl)-phenyl]-acetic acid-2-(1-pyrrolidinyl)-ethyl ester;
[p-(1-pyrryl)-phenyl]-acetic acid-2-(dimethylamino)-ethyl ester and their pharmaceutically acceptable acid addition salts.

The compounds of the present invention were found to have valuable pharmacological properties, in particular analgesic, anti-inflammatory and musculotripic-spasmolytic activity. The therapeutic index is very favorable also with respect to gastro-intestinal side effects which some of the known anti-inflammatory agents exhibit. The pharmacological activity of the compounds of the invention is determined in various standard tests with experimental animals.

The analgesic activity is demonstrated in the "writhing test" in mice. This test is described by E. Siegmund, R. Cadmus and G. Lu, Proc. Soc. Exp. Biol. Med., 95, 729 (1957). The amount of test substance is determined preventing in the test animals the syndrom produced by intraperitoneal injection of 2-phenyl-1,4-benzoquinone. Excellent results are obtained by oral administration of 37 mg./kg. of body-weight of [p-(1-pyrryl)-phenyl]-acetic acid-2- (dimethylamino)-1-methyl-ethyl ester hydrochloride.

As an example of the use as anti-inflammatory agent, the use of [p-(1-pyrryl)-phenyl]-acetic acid-2-(dimethylamino)-ethyl ester hydrochloride in bolus alba induced edema in the rat paw is described. The test used is that described by G. Wilhelmi, Jap. Journ. Pharmac., 15, 190 (1965). The compound under investigation is administered to rats perorally through an esophageal sound. One hour thereafter bolus alba edema is induced by subcutaneous injection of 0.1 ml. of a 10% suspension of finely sieved bolus alba in tragacanth into the plantar region of the right hand paw of the rats. Another group of rats having not obtained the test compound, but the bolus alba, serves as control group. Each group consists of 20 male albino rats weighing about 110 to about 130 g. The intensity of the swelling of the rats' paw is determined 5 hours after the bolus alba injection, by measuring the weight differences of the unswollen left paws and the swollen right paws. Thus, it is determined that [p-(1-pyrryl)-phenyl]-acetic acid-2-(dimethylamino)-ethyl ester hydrochloride administered in a dosage of about 25 mg./kg. of body weight significantly inhibits the formation of the bolus alba edema, indicating a pronounced anti-inflammatory activity.

Similar analgesic and anti-inflammatory activities are found with other compounds of the invention. The musculotropic spasmolytic activity of the ester of Formula I can be shown e.g. in experiments on the isolated guinea-pig intestine in which the dosage is measured having the same spasmolytic activity as papaverine in the contraction caused by barium chloride.

The toxicity of the compounds of the invention as determined in rats on oral administration is of favorable low order.

The esters of Formula I and their acid addition salts are prepared by reacting a compound of Formula II

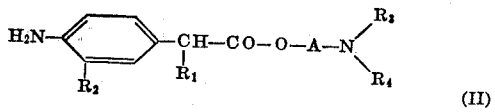

(II)

in which $R_1$, $R_2$, $R_3$, $R_4$ and A have the meaning given under Formula I or an acid addition salt thereof with monomeric or polymeric succinaldehyde or an open or cyclic reactive functional derivative of the monomeric succinaldehyde and if desired the obtained base of Formula I is converted with an inorganic or organic acid into an addition salt.

The succinaldehyde is added in its monomeric form (which immediately before the reaction is obtained from a functional derivative or from distillation of the polymeric form) or in a polymeric modification (cf. C. Harries Ber., 35, 1183 and 1189 (1902)).

As functional derivative of the monomeric succinaldehyde are used particularly open or cyclic acetales, acylals, α-halogenethers, enolethers or enolesters according to general Formula III

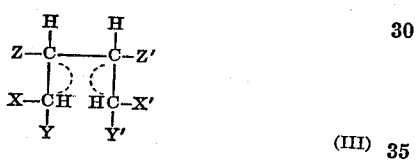

(III)

in which

X and X' are independent of each other rests of formulas R—O— and R—CO—O— in which R is an optional halogen substituted hydrocarbon rest, or chlorine or bromine atoms, or X' together with Y' is also the oxo-rest =O, Y and Y' are independent of each other rests of the before defined formulas R—O— or R—CO—O— or both together the epoxy rest —O— or each together with Z resp. Z' each an additional binding corresponding to the dotted lines, and Z and Z' are hydrogen atoms as long as they do not have any of the before named meaning, in presence or absence of a diluting and/or condensation agent.

Of the compounds of Formula III which can be used instead of succinic aldehyde are named as examples of open-chain derivatives of the monomeric succinic aldehyde the acetals thereof such as succinic aldehyde-mono-diethylacetal, -bis-dimethyl-acetal, -bis-diethylacetal, acylals like succinic aldehyde-1,1-diacetate (4,4-diacetoxy-butyraldehyde), enolethers like 1,4-diphenoxy-butadiene, enolesters like 1,4-diacetoxy-butadiene. Compounds of Formula III in which Y and Y' form together the epoxy rest are formal derivatives of the tetrahydrofuran which depending upon the meaning of X and X' react like the acetals or acylals of the succinic aldehyde or the like open-chained α-halogenethers. Such compounds are e.g. the 2,5-dialkoxy-tetrahydrofurans and relatives like 2,5-dimethoxy-, 2,5-diethoxy-, 2,5-dipropoxy-, 2,5-dibutoxy-, 2,5-disallyloxy-, 2,5-bis(2-chlorethoxy)-, 2,5-diphenoxy-, and 2,5-bis(3,4-xylyloxy)-tetrahydrofuran, additional, 2,5-diacyloxy-tetrahydrofuran like 2,5-diacetoxy - tetrahydrofuran, as well as 2,5-dihalogen-tetrahydrofuran like 2,5-dichloro - tetrahydrofuran and 2,5-dibromo-tetrahydrofuran, and finally also compounds which belong to two types like 2-chloro-5-(2-chlorethoxy) - tetrahydrofuran and 2-alloxy-5-chloro-tetrahydrofuran.

As medium for the inventive reaction, if free or in situ liberated succinic aldehyde is used, any solvent in which this is soluble, e.g. methanol, ethanol or acetic acid is suitable. Acetals and acylals of the succinic aldehyde as well as cyclic acetal-like derivatives are reacted preferably in acetic acid as solvent and condensation agent, or in presence of catalytical amount of an acetic condensation agent like p-toluenesulfonic acid, in presence or absence of an inert organic solvent or diluting agent like e.g. benzene, toluene, o-dichlorobenzene or acetonitrile. The reaction of compounds of Formula III in which X and/or X' are halogen atoms is carried out e.g. in inert organic solvents like chloroform or the above named. The reaction temperature is preferably between room temperature and boiling temperature of the solvent or diluting agent used whereby the lowest range is particularly suitable for the last named halogen compounds.

Of the starting materials of Formula II the (p-aminophenyl)-acetic acid-2-(diethylamino)-ethylester is known. Other compounds of Formula II are prepared e.g. according to the known compound by reduction of the corresponding 2-(p-nitrophenyl)-alkanoic acid ester or according to other known methods for preparation, e.g. by re-esterification of the corresponding 2-(p-aminophenyl)-alkanoic acid-alkyl-ester like the methylester and ethyl ester of the known (p-aminophenyl)-acetic acid, p-aminohydratropic acid, 2-(p-aminophenyl)-butyric acid and 2-(p-aminophenyl)-valeric acid, with basic alcohols of the Formula V given below.

According to a second method for preparation the new esters and their acid addition salts are prepared by reacting a substituted phenyl acetic acid of Formula IV

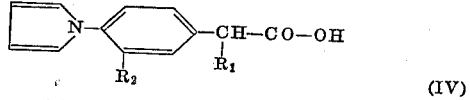

(IV)

in which $R_1$ and $R_2$ have the meaning given under Formula I, or a reactive functional derivative thereof with a basic alcohol of Formula V

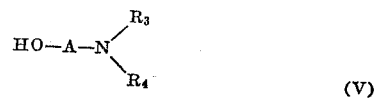

(V)

in which $R_3$, $R_4$ and A have the meaning given under Formula I and, if desired, converting the obtained esters of Formula I with an inorganic or organic acid into an addition salt. Thus, for example, a substituted phenyl acetic acid of Formula IV is boiled with a basic alcohol of Formula V in a solvent of suitable boiling point which distils with water azeotropically such as benzene, toluene or xylene, preferably in presence of a catalyst like, e.g. p-toluene sulfonic acid on a water separator. It is also possible to react the above-named starting materials in presence of an acid halide such as thionyl-chloride, phosphoroxychloride or chlorosulfonic acid with an excess of basic alcohol or in an inert organic solvent such as benzene, methylenechloride or chloroform. As reactive functional derivative of acids of Formula IV there are most suitable lower alkylesters thereof.

The latter are heated in an excess of a basic alcohol of Formula V in the presence of a catalyst such as the corresponding in situ formed sodium alcoholate in the presence or absence of an additional solvent such as toluene under partly refluxing so that the liberated lower alkanol is continuously removed from the reaction mixture. It is possible to use instead of an excess of a basic alcohol of the Formula V an equivalent amount thereof. In this case, the presence of a solvent is necessary, e.g. toluene. Other reactive functional derivatives of acids of Formula IV are the halogenides thereof, particularly chlorides, and mixed anhydrides, such as with benzene sulfonic acid and p-toluene sulfonic acid. These derivatives are reacted preferably in situ in the presence of a tert. organic base such as 2,6-lutidine or sym.collidine, in an inert organic solvent such as methylenechloride or benzene, or also in pyridine as the only reaction medium, with thionylchloride or the corresponding acid chlorides and in the same medium with the basic alcohol of Formula V.

The acids of Formula IV and the lower alkylesters thereof which are necessary as starting materials are prepared according to the first named methods for preparation of esters of Formula I from lower 2-(p-aminophenyl)-alkanoic acids as well as from 2-(4-amino-3-halogenphenyl)-alkanoic acids and the lower alkylesters thereof. The [3-chloro-4-(1-pyrryl)-phenyl]-acetic acid and the lower alkylesters thereof are obtained by chlorinating the known (p-acetamido-phenyl)-acetic acid with hydrochloric acid and sodium chlorate, hydrolysing under acidic conditions to the (4-amino-3-chlorophenyl)-acetic acid, if desired converting the last-named into a lower alkylester and condensing the acid or its esters according to the first named method for preparation of compounds of Formula I with, e.g. 2,5-dimethoxy-tetrahydrofuran in boiling acetic acid. Carbonic acids of Formula IV with $R_1$ being a lower alkyl group can be prepared generally by condensing lower [p-(1pyrryl)-phenyl]-acetic acid alkylesters or [3-halogen-4-(1-pyrryl)-phenyl]-acetic acid alkylesters such as the above-mentioned [3-chloro-4-(1-pyrryl)-phenyl]-acetic acid alkylesters with an excess of diethylcarbonate by sodiumethylate in toluene followed by condensing the sodium derivatives of the formed [p-(1-pyrryl)-phenyl]- and [3-halogen-4-(1-pyrryl)-phenyl]-resp. malonic acid dialkylester with lower alkylhalides such as methyl- or ethyl-iodide, hydrolysing the obtained disubstituted malonic acid dialkylesters and decarboxylating the liberated disubstituted malonic acids.

A third method for the preparation of esters of Formula I and their acid addition salts is that a carboxylic acid of Formula IV or a salt thereof is reacted with a reactive ester of a basic alcohol of Formula V and, if desired, an obtained acid addition salt of a base of Formula I is converted into the free base or into another addition salt or an obtained free base is converted with inorganic or organic acid into an addition salt.

As reactive esters of basic alcohols of Formula V are used particularly hydrohalic acid esters such as chlorides or bromides, arylsulfonic acid or alkane sulfonic acid esters such as p-toluene sulfonic acid ester or methanesulfonic acid ester. The reaction with free carboxylic acids of Formula IV is performed e.g. by heating in an inert organic solvent such as isopropanol, sec. butanol, benzene, toluene, dimethylformamide or dimethylsulfoxide at temperatures of between 80° and the boiling temperature of the solvent used. Reactions of reactive esters of basic alcohols of Formula V with particularly alkalimetal salts, and also with silver or mercury salts of carboxylic acids of Formula IV are carried out in organic solvents such as benzene, toluene, dimethylformamide, isopropanol or n-butanol at slightly raised to boiling temperature of the medium. Instead of preparing the metal salts before the reaction, these can be formed also in situ, e.g. by heating a reactive ester with the free carboxylic acid in presence of a compound which furnishes metal ions, for example potassium carbonate, in one of the above-named solvents. By use of a compound which furnishes a corresponding excess of metal ions, it is possible to use instead of a reactive ester of a basic alcohol of Formula V an acid addition salt thereof, e.g. a lower dialkylamino-dialkylchloride-hydrochloride.

If desired, the compounds of Formula I are converted in conventional manner into addition salts with inorganic or organic acids, e.g. one adds to a solution of a compound of Formula I in an organic solvent like diethylether, toluene or ethanol the acid desired as salt component or a solution thereof and separates the salt which precipitates either immediately or after adding a second less-polar organic solvent.

For use as active ingredients in pharmaceutical compositions it is preferred to use instead of the free bases their pharmaceutically acceptable acid addition salts, i.e. salts with such acids the anions of which show at effective dose levels either none or only desired own pharmacological activity. It is also of advantage if the salts which are used as active ingredients are well crystallisable and are not or only little hygroscopic. Suitable salts of compounds of Formula I for therapeutic applications are derived from e.g. hydrochloric acid, hydrobromic acid, sulfuric acid, phosphoric acid, methanesulfonic acid, ethanesulfonic acid, β-hydroxyethanesulfonic acid, acetic acid, hydroxysuccinic acid, tartaric acid, citric acid, lactic acid, succinic acid, fumaric acid, maleinic acid, benzoic acid, salicylic acid, phenyl acetic acid, mandelic acid, embonic acid, 1,5-naphthalindisulfonic acid and the like.

Pharmaceutical compositions contain at least one new compound of Formula I and/or at least one pharmaceutically acceptable salt thereof with an inorganic or organic acid in combination with an inert carrier and if desired other additives. The pharmaceutical compositions preferably consist in dosage unit forms which are suitable for oral, rectal or parenteral application of daily doses of 50 to 3000 mg. of active ingredient, i.e. a compound of Formula I or a pharmaceutically acceptable acid addition salt thereof, to adult patients and with correspondingly reduced doses to children. Suitable dosage unit forms for oral or rectal application such as dragées, tablets, capsules and suppositories contain preferably 10 to 500 mg. of a free base of Formula I or of a pharmaceutically acceptable salt thereof. In the dosage unit forms, the amount of active ingredient is preferably 5% to 90%. For the preparation of tablets or dragée cores, the active ingredients are combined with solid pulverised carriers like lactose, saccharose, sorbit or mannit; starches like potato starch, corn starch or amylopectine, high dispersed silicon dioxide, laminaria powder or citrus pulp powder; cellulose derivatives or gelatine, if desired, under addition of sliding agents like magnesium or calcium stearate or polyethyleneglycols and the mixture is pressed into the desired form. The dragée cores are coated, e.g. with concentrated sugar solutions which may also contain arabic gum, talc and/or titandioxide or with a volatile organic solvent or organic solvent mixtures containing a dissolved lacquer. To these coatings can also be added pigments to mark different dosage forms. Suitable other oral dosage unit forms are plugged capsules from gelatine as well as soft closed capsules from gelatine and a plasticiser like glycerine. The hard plugged capsules contain the active ingredient preferable as granulate, if desired in mixture with diluting agents like corn starch, with sliding agents like talc or magnesium stearate, and, if desired, stabilisers like sodium metabisulfite ($Na_2S_2O_5$) or ascorbinic acid.

In soft capsules the active ingredient is preferably dissolved or suspended in suitable solvents like liquid polyethyleneglycols whereby, if desired, also stabilisers can be added.

Suitable dosage unit forms for the rectal application are suppositories, consisting of a combination of a compound of Formula I or a suitable salt thereof and a suppository basic mass, e.g. natural or synthetic triglycerides or also gelatine-rectal capsules, containing a combination of the active ingredient and polyethyleneglycols.

Ampoules for parenteral, particularly intramuscular and intravenous application contain preferably 10 to 200 mg. of a pharmaceutically acceptable water soluble acid addition salt of a compound of Formula I. The concentration of the active ingredient is preferably between 0.5% to 10%, if necessary suitable stabilisers and/or puffer compounds are added to the ampoule solutions.

Embraced by the present invention are pharmaceutical compositions not made up in single dosge units forms such as ointments, tinctures and other mixtures for local or percutaneous application which are prepared with suitable known pharmaceutical carriers.

As mentioned above, the compounds of the present invention preferably in form of the described pharmaceutical compositions can be used in mammals orally, rectally or parenterally for alleviating pain of various genesis, e.g. of spastic pain conditions, and for the treatment of inflammatory diseases of rheumatic, arthritic and the like nature. It is to be understood that the dosage administered will be dependent on the species; the age, health and weight of the recipient; the severity of the condition being treated; the kind of concurrent treatment, if any; the frequency of treatment and the nature of the effect desired. Generally, the daily dosage of an active compound of Formula I or a pharmaceutically acceptable acid addition salt thereof will be from about 1 to about 80 mg./kg. of body weight. A preferred range is from about 1 to about 60 mg./kg. of body weight per day.

The following examples will serve to further typify the nature of the present invention; they should not however, be construed as a limitation on the scope thereof. Temperatures are given in degree centigrade.

EXAMPLE 1

8.2 g. (p-aminophenyl)-acetic acid-2-(dimethylamino)-ethylester are mixed with 80 ml. glacial acetic acid and 4.9 g. 2,5-dimethoxytetrahydrofuran and refluxed for 40 minutes (bath temperature 130 to 150°). The dark reaction mixture is cooled and evaporated on the rotary evaporator under reduced pressure (50 to 12 torr). The resulting oil is distilled in a bulb tube under 0.01 torr and 180 to 220° air bath temperature. The distillate is taken up in 60 ml. of ether and the ether solution is extracted with 30 ml. ice cold 2 N hydrochloric acid. The aqueous acidic extract is made alkaline with saturated potassium bicarbonate solution (approx. 20–30 ml.) and extracted twice with each 100 ml. ether. After drying over anhydrous magnesium sulfate the combined ether extracts are evaporated. The oily resulting basic reaction product crystallizes. It is dissolved in 30 ml. ether and the solution is neutralised with 4 ml. 2.8 N ethereal hydrochloric acid solution. The resulting crystalline precipitate of the [p-(1-pyrryl) - phenyl]-acetic acid-2-(dimethylamino)-ethylester-hydrochloride is suctioned off and recrystallised from isopropanol-methanol. The crystals obtained melt at 159–161°.

The (p-aminophenyl)-acetic acid-2-(dimethylamino)-ethylester which is required as starting material is prepared according to the following procedure:

10.2 g. (p-aminophenyl)-acetic acid-ethylester [E. Ferber et al., Ber., 72, 839 (1939)], 50 ml. 2-(dimethylamino)-ethanol in which are dissolved 50 mg. sodium and 125 ml. toluene are refluxed for 20 hours under a 20 cm. long Vigreux column so that the temperature on the head of the column is 50 to 90° whereby the liberated ethanol distils azeotropically. The reaction mixture is concentrated at 50 to 12 torr and the residue is treated with 0.8 ml. 2.8 N ethereal hydrochloric acid solution neutralising the sodium alcoholate. The residue is distilled in a bulb tube at 210 to 230° bath temperature and 0.1 torr. One obtains the (p-aminophenyl)-acetic acid-2-(dimethylamino)-ethyl ester as colorless oil.

According to the above example, one obtained by use of 9.1 g. (p-aminophenyl)-acetic acid-2-(diethylamino)-ethylester (Pyman, J. Chem. Soc., 111, 170) the [p-(1-pyrryl)phenyl]-acetic acid-2-(diethylamino)-ethylester as well as the hydrochloride thereof of M.P. 123–125° (from ethylacetate-ethanol).

EXAMPLE 2

0.20 g. sodium are dissolved in 150 ml. 2-(dimethylamino)-ethanol and refluxed with a solution of 24.0 g. [p-(1-pyrryl)-phenyl]-acetic acid-ethylester in 150 ml. toluene under a 20 cm. Vigreux column and then distilled until the temperature rises on the head of the column to 110°. The toluene is distilled off at atmospheric pressure. The remaining toluene and the amino alcohol are then distilled off on a rotary evaporator under vacuum of 10 to 15 mm. In the resulting oil, the sodium is neutralised with 1.9 ml. 4.6 N ethereal hydrochloric acid solution. The now turbid oil is distilled in high vacuum. The fraction which distils at 170–185°/0.01 torr consists of [p-(1-pyrryl)-phenyl]-acetic acid-2-(dimethylamino)-ethylester. This is dissolved in 100 ml. ether and treated while stirring and cooling with 20 ml. 4.6 N ethereal hydrochloric acid solution. The precipitated crude hydrochloride is recrystallised once from isopropanol-ether and once from acetone-ethanol and has a melting point of 159–161°.

Analogously is obtained from 6.9 g. [p-(1-pyrryl)-phenyl]-acetic acid-ethylester and 20 ml. 3-(1-pyrrolidinyl)-propanol the [p-(1-pyrryl)-phenyl]-acetic acid [3-(1-pyrrolidinyl)-propyl]-ester which distils in the bulb tube at 180°/0.001 torr. The hydrochloride thereof melts at 108–111° (from chloroform-ether).

The [p-(1-pyrryl)-phenyl]-acetic acid-ethylester which is used as starting material is prepared according to the following procedure: (a) 21.4 g. (p-aminophenyl)-acetic acid-ethylester [E. Ferber et al., Ber., 72, 839 (1939)], 15.9 g. 2,5-dimethoxy-tetrahydrofurane and 30 ml. glacial acetic acid are refluxed for 1 hour. The solvent is then distilled off at reduced pressure (10–15 mm.). The residue is distilled in high vacuum whereby the [p-(1-pyrryl)-phenyl]-acetic acid-ethylester distils at 122–130°/0.02 torr. After recrystallisation from methanol it melts at 55–56°.

EXAMPLE 3

In a mixture of each 50 ml. 2 - morpholinoethanol and abs. toluene are dissolved while slightly warming 80 mg. sodium. Then there are added 6.9 g. [p - (1 - pyrryl)-phenyl) - acetic acid - ethyl - ester [see Example 2] and the resulting solution is heated under a 20 cm. long Vigreux column in an oil bath of 140–160° so that the temperature is on the column head 60–90°. Thereafter the bath temperature is raised to 180° and the toluene is distilled off. The remaining volatile parts are removed on the rotary evaporator at 80–120° and 10 torr. The sodium or the alcoholate thereof which has been used as catalyst is neutralised with an equivalent amount of ethereal hydrochloric acid solution (e.g. 1.3 ml. 2.8 N acid). The reaction mixture is then distilled in a bulb tube at 0.1 torr and 180–220° air bath temperature. The resulting [p-(1-pyrryl)-phenyl]-acetic acid - 2 - morpholino - ethylester is dissolved in 40 ml. ether and the hydrochloride is precipitated with 9.1 ml. 2.8 N ethereal hydrochloric acid solution. After one recrystallization from isopropanol and one from abs. ethanol it melts at 156–160°.

Analogously are obtained:

From 6.9 g.[p - (1-pyrryl) - phenyl] - actic acid-ethylester and 50 ml. 2 - piperidinoethanol the [p-(1-pyrryl)-phenyl]-acetic acid - 2 - piperidino-ethylester. M.P. of the hydrochloride 172–175° (from isopropanol-methanol);

From 6.9 g. [p - (1-pyrryl)-phenyl]-acetic acid-ethylester and 50 ml. 3 - (dimethylamino) - 1 - propanol the [p-(1-pyrryl)-phenyl]-acetic acid - 3 - (dimethylamino)-propylester, M.P. of the hydrochloride 151–153° (from chloroform-ether);

From 6.9 g.[p-(1-pyyryl)-phenyl]-acetic acid-ethylester and 50 ml. 2 - (diethylamino) - 1 - ethanol the [p-(1-pyrryl) - phenyl]-acetic acid - 2 - (diethylamino) - ethylester, M.P. of the hydrochloride 123–125° (from abs. ethanol).

EXAMPLE 4

According to Example 3 there are obtained from 7.3 g. 2-[p-(1-pyrryl)-phenyl]-propionic acid-ethylester and 50 ml. 2 - (dimethylamino) - ethanol the 2 - [p-(1-pyrryl)-phenyl]-propionic acid - 2 - (dimethylamino) - ethylester which distils in the bulb tube at 130–140°/0.001 torr. M.P. of the hydrochloride 141–144° (from abs. ethanol).

The ethylester which is used as starting material is prepared according to the following procedure:

(a) A mixture of 80 g. [p-(1-pyrryl)-phenyl]-acetic acid-ethylester and 280 ml. of diethylcarbonate are heated to 80°. At 75–80° a solution of 10.0 g. sodium in 450 ml. abs. ethanol is rapidly dropped in while stirring. The ethanol is then distilled off from the reaction mixture. With gradual raising of the bath temperature to 230° it is distilled untill the vapour temperature reaches 118°. Then there are added 200 ml. diethylcarbonate and distilled off till the vapour temperature reaches 120°. The contents of the flask are cooled in ice and with a mixture of 50 ml. glacial acetic acid and 800 ml. ice water neutralised. The mixture is then twice extracted with each 400 ml. ether, the ether solution is washed with 5% potassium bicarbonate solution, dried over sodium sulfate and narrowed down whereby the [p-(1-pyrryl)-phenyl]-malonic acid-diethylester crystallises. It is filtered off and washed with 50 ml. of a mixture of petrolether-benzene (2:1) and dried in vacuo. One obtains the desired ester as beige crystals, M.P. 76–81°. On recrystallisation from methanol the melting point rises to 80–83°.

(b) 2.0 g. sodium are dissolved in 80 ml. abs. ethanol. The solution is warmed to 50° and to the solution is added at 50° a warm solution of 24.0 g.[p-(1-pyrryl)-phenyl] malonic acid-diethylester in 60 ml. abs. ethanol. The mixture is stirred for half an hour at 40–50°, and then to the mixture are dropped very rapidly 16.0 g. methyliodide. Thereafter the reaction mixture is refluxed for 4 hours while stirring and then again 16.0 g. methyliodide are added. After more refluxing for 2 hours, the reaction mixture is evaporated under reduced pressure, taken up in 300 ml. ether and washed with each 40 ml. 10% sodium bisulfite solution and water. The ether solution is dried over sodium-sulfite and evaporated whereby a yellow oil remains. This is refluxed for 1 hour with 6.8 g. potassium hydroxide dissolved in 100 ml. water whereby the monosubstituted malonic acid-diethylester (starting material) is hydrolised while the desired reaction product remains unchanged. After cooling, the solution is extracted twice with each 200 ml. ether. The ethereal solution is washed with water neutral and evaporated. The remaining oil crystallises spontaneously. On recrystallisation from benzene-petrolether one obtains the methyl-[p-(1-pyrryl)-phenyl]-malonic acid-diethylester as colourless crystals, M.P. 57–58°.

(c) 19.0 g. methyl-[p-(1-pyrryl)-phenyl]-malonic acid-diethylester, 14.0 g. potassium hydroxide, 50 ml. water and 150 ml. n-butanol are refluxed for 4 hours while stirring. The solvent is distilled off at approximately 12 torr and the residue is dissolved in 300 ml. water. The aqueous solution is extracted with 150 ml. ether and after filtration brought with 2 N hydrochloric acid to pH 1–2. The fine colourless precipitate is suctioned off and washed with water. The 2-[p-(1-pyrryl)-phenyl]-propionic acid so obtained as colourless crystals melts at 168–169°.

(d) 43.0 g. 2-[p-(1-pyrryl)-phenyl]-propionic acid are refluxed for 6 hours with a solution of 8 ml. conc. sulfuric acid in 260 ml. abs. ethanol. The ethanol is carefully distilled off at 10 to 15 torr and 30–40° bath temperature, the evaporated residue taken up in 1 l. methylenechloride and the solution extracted with 100 ml. ice water and then with 100 ml. 10%potassium bicarbonate solution. The methylenechloride phase is dried over magnesium sulfate and evaporated. The 2 - [p - (1-pyrryl)-phenyl]-propionic acid-ethylester distils at 0.01 torr at 120–140° air bath temperature.

EXAMPLE 5

8.3 g. 2-[3-chloro-4-(1-pyrryl)-phenyl]-propionic acid-ethylester are refluxed in a solution of 80 mg. sodium in 50 ml. 2-(dimethylamino)-ethanol and 50 ml. of toluene. The light volatile parts are distilled off under a 20 cm. long Vigreux column, whereby the bath temperature is regulated in such a way that the temperature on the end of the column in 60–90°. After 2 to 5 hours the toluene is also distilled off, at last at 10–15 torr on the rotary evaporator, whereby also the excess of amino-alcohol distils off. In the remaining oil the sodium resp. the alcoholate thereof is neutralised by addition of 0.8 ml. 4.6 N ethereal hydrochloric acid solution. The oil is distilled off at a bath temperature of 130–140° and 0.001 torr in a bulb tube. One obtains the 2-[3-chloro-4-(1-pyrryl)-phenyl]-propionic acid-2-(dimethylamino)-ethylester; $n_D^{21}=1.5518$. M.P. of the fumarate 158–159° (from methanol/ether).

The starting material is prepared according to the following procedure:

(a) 149.0 g. p-(acetamido)-phenyl acetic acid [S. Gabriel, Chem. Ber., 15, 834 (1882)] are suspended in a mixture of 485 ml. glacial acetic acid, 165 ml. water and 348 ml. conc. hydrochloric acid. To this suspension is dropped while vigorously stirring at —5° a solution of 32.2 g. sodium chlorate in 65 ml. water within 1 hour. The reaction mixture is braought to 0° and stirred for 15 minutes. Then are added 75 ml. conc. hydrochloric acid, the solution is refluxed for 2 hours and then evaporated on a steam bath of 80° under 15 torr to dryness. The residue is ground (hot) with 250 ml. ethanol to remove the remaining water by azeotrope distillation, and after adding 750 ml. benzene again evaporated in vacuum. The dry crystalline residue is refluxed with a solution of 60 ml. conc. sulfuric acid in 1.5 l. abs. ethanol for 20 hours. The ethanol is then distilled off in a bath of 30° under 15–20 torr. The residue is brought with mixture of the same amount ice and conc. sodium hydroxide to pH 9–10 and extracted with 1.5 l. methylenechloride. The methylenechloride solution is washed with 100 ml. ice water, dried over magnesium sulfate and evaporated. The residue is fractionated over a 10 cm. long Vigreux column, and the (4-amino-3-chlorophenyl)-acetic acid-ethylester (83 g.) which distils at 110–115°/0.001 torr is separated.

(b) 55.5 g. (4-amino-3-chloro-phenyl)-acetic acid-ethylester, 500 ml. glacial acetic acid and 34.3 g. 2,5-dimethoxy-tetrahydrofuran are refluxed for 40 minutes. The cooled reaction mixture is evaporated under reduced pressure, at last under 10 torr at 70° bath temperature. The resulting black oil is distilled in a bulb tube. It boils under 0.01 torr at 120–130° air bath temperature. The obtained [3-chloro-4-(1-pyrryl)-phenyl] - acetic acid - ethylester crystallises after longer standing or on inoculation. A sample recrystallised from ligroin (boiling range 80–95°) melts at 36–37°.

(c) A mixture of 62.0 g. [3-chloro-4-(1-pyrryl)-phenyl]-acetic acid-ethylester, 200 ml. toluene and 260 ml. diethylcarbonate is warmed to 70°. At 75–80° a solution of 5.6 g. sodium in 200 ml. abs. ethanol is dropped in while stirring. The ethanol is then distilled off. By gradually rising the bath temperature to 230° it is distilled until the temperature of the vapour reaches 115°. Into this are dropped another 200 ml. diethylcarbonate and the whole is distilled off until the temperature of the vapour reaches 120°. The contents of the flask are cooled in ice and neutralised with a mixture of 40 ml. glacial acetic acid and 400 ml. ice water. The mixture is extracted twice with each 400 ml. ether, the ether solution washed with 5% potassium bicarbonate solution, dried over sodium sulfate and narrowed down whereby approx. 80 g. crude [3-chloro-4-(1-pyrryl)-phenyl]-malonic acetic acid-diethylester are obtained. It boils on distillation in the bulb tube under 0.01 torr at 140–145° bath temperature. (Yield 72.0 g.).

(d) 5.1 g. sodium are dissolved in 120 ml. abs. ethanol. The solution is warmed to 50° and then is added an approximately 50° warm solution of 68.0 g. [3-chloro-4-(1-pyrryl)-phenyl]-malonic acid-diethylester in 120 ml. abs. ethanol. The mixture is stirred for half an hour at 20–30° and then 33.0 g. methylene-iodide are dropped rapidly thereto. Thereafter the reaction mixture is refluxed for 1½ hours while stirring, then there are added once more 11.0 g. methyliodide. After more refluxing for half an hour the reaction mixture is evaporated under reduced pressure, taken up in 400 ml. ether and washed with each 60 ml. water, 10% sodium bisulfite solution and 20% potassium biccarbonate solution. The ether solution is dried over sodium sulfate and evaporated whereby a yellow oil is obtained (66 g.). The [3-chloro-4-(1-pyrryl)-phenyl]-methyl-malonic acid-diethyl-ester is distilled in the bulb tube. It boils under 0.02 torr at 130–140° air bath temperature; $n_D^{21}=1.544$. (Yield 60.2 g.).

(e) 52.3 g. [3-chloro-4-(1-pyrryl) - phenyl] - methyl-malonic acid-diethylester, 33.6 g. potassium hydroxide, 120 ml. water and 400 ml. n-butanol are refluxed for 4 hours while vigorously stirring. The solvent is evaporated at approximately 12 torr and the residue is dissolved in 300 ml. water. The aqueous solution is extracted with 150 ml. ether and after filtration brought with conc. hydrochloric acid to pH 1–2. The oil which separates is extracted twice with each 200 ml. ether, the ether extract is washed with 500 ml. water, dried over magnesium sulfate and evaporated under reduced pressure. The resulting oil is distilled in a bulb tube at 160–175° bath temperature under 0.01 torr. One obtains 34.2 g. oily 2-[3-chloro-4-(1-pyrryl)-phenyl]-propionic acid. This can as such be esterified. After dissolving in ether and cooling crystals form slowly with M.P. 73–76°. On recrystallisation from ethylacetate the melting point of the acid rises to 78–80°.

(f) 30.0 g. crude 2-[3-chloro-4-(1-pyrryl)-phenyl]-propionic acid are refluxed with 300 ml. abs. ethanol and 4.5 ml. conc. sulfuric acid for 20 hours. The reaction mixture is evaporated under reduced pressure (10–15 torr) at a bath temperature of 30–40° and taken up in 1 l. methylenechloride. The methylenechloride is washed with 100 ml. ice water and then with 50 ml. saturated potassium bicarbonate solution, dried over sodium sulfate and evaporated. The resulting 2-[3-chloro-4-(1-pyrryl)-phenyl]-propionic acid-ethylester is distilled in the bulb tube under 0.03 torr and at an air bath temperature of 130–140 $n_D^{21}=1.5565$.

EXAMPLE 6

According to Example 5 one obtains from 8.0 g. [3-chloro-4-(1-pyrryl)-phenyl]-acetic acid-ethylester [see Example 5(a) and (b)] and 50 ml. 2-(dimethylamino)-ethanol the [3-chloro-4-(1-pyrryl)-phenyl]-acetic acid-2-(dimethylamino)-ethylester as nearly colourless oil which is distilled in the bulb tube at 170–190° bath temperature under 0.004 torr; $n_D^{21}=1.5576$. M.P. of the fumarate 119–120° (from methanol/ether).

EXAMPLE 7

According to Example 3 one obtains from 4.4 g. 2-[3-chloro-4-(1-pyrryl)-phenyl]butyric acid-ethylester and 30 ml. 2-(dimethylamino)-ethanol the 2-[3-chloro-4-(1-pyrryl)-phenyl]-butyric acid-2-(dimethylamino)ethylester which distils in the bulb tube at 150–160° under 0.001 torr. M.P. of the hydrochloride 118–121° (from ethylacetate-isopropanol).

The ethylester which is used as starting material is prepared according to the following procedure:

(a) 31.0 g. 2-(p-acetamido-phenyl)-butyric acid (B. Samdahlr and B. Berg. Soc. Chim. France, 1951, 94) are suspended in a mixture of 60 ml. acetic acid and 65 ml. conc. hydrochloric acid. To this mixture a solution of 6.2 g. sodium chlorate in 7.5 ml. water is dropped while vigorously stirring at −10° within 45 minutes. The obtained suspension is warmed to 0° and stirred for 15 minutes at this temperature. Then there are added 45 ml. conc. hydrochloric acid and the mixture is refluxed for 2 hours. The clear reaction solution is evaporated on the steam bath (100°) under 10 torr to dryness. The crystalline residue is as far as possible dissolved in 125 ml. water, some solid, not soluble compound is separated by filtration and the filter product washed twice with 15 ml. water. Filtrate and washing water are combined and brought by addition of 3 N sodium hydroxide solution (approximately 62 ml.) to pH 1.9. The resulting, light-brown precipitate is filtered off, washed twice with 25 ml. water and dried at 80° whereby one obtains 24.8 g. crude 2-(4-amino-3-chlorophenyl)-butyric acid of M.P. 112–113°. This can directly be used for the next reaction. By recrystallisation from cyclohexene-benzene and then from methanol-water one obtains analytically pure compound, M.P. 115–116°.

(b) 24.8 g. 2-(4-amino-3-chlorophenyl)butyric acid of M.P. 112–113° (see above) and 15.3 g. 2,5-dimethoxytetrahydrofuran are refluxed in 35 ml. acetic acid for 30 minutes. The reaction mixture is cooled to room temperature and one adds 50 ml. ether and 150 ml. 2 N hydrochloric acid. The mixture is intensively shaken and then some resinous by-products decanted off. The ether solution is separated, washed twice with 50 ml. 1 N hydrochloric acid, dried over magnesium sulfate and evaporated. The residue is distilled in high vacuum whereby the 2-[3-chloro-4-(1-pyrryl)-phenyl]-butyric acid of B.P. 164°/0.1 torr, $n_D^{25}=1.5976$ is obtained. The compound crystallises on standing, M.P. 68–74°; after recrystallisation from cyclohexan-benzene (20:1) M.P. 75–76°. The Ehrlich reaction is positive.

(c) 26.4 g. 2-[3-chloro-4-(1-pyrryl)-phenyl]-butyric acid are refluxed with a solution of 5 ml. conc. sulfuric acid in 150 ml. abs. ethanol for 6 hours. The ethanol is then carefully distilled off in the vacuum of 10–15 torr at 30–40° bath temperature. The residue is taken up in 1 l. methylenechloride and the solution extracted with 100 ml. ice water and then with 100 ml. 10% potassium bicarbonate solution. The methylenechloride phase is dried over mangesium sulfate and evaporated. The 2-[3-chloro-4-(1-pyrryl)-phenyl]-butyric acid-ethylester distils in the bulb tube under 0.01 torr at 180° air bath temperature; $n_D^{21}=1.551$.

EXAMPLE 8

(i) From 7.3 g. 2-[p-(1pyrryl)-phenyl]-butyric acid-methylester and 50 ml. 2-(dimethylamino)-ethanol is prepared according to Example 3 the 2-[p-(1-pyrryl)-phenyl]-butyric acid-2-(dimethylamino)-ethyl-ester, M.P. of the hydrochloride 155–158° (from isopropanol).

(ii) In an analogous manner is obtained from 7.3 g. 2-[p-(1-pyrryl)-phenyl]-butyric acid-methylester and 50 ml. 3-(dimethylamino)-1-propanol in 50 ml. toluene the 2-[p-(1-pyrryl)-phenyl]-butyric acid-3-dimethylamino)-propylester, M.P. of hydrochloride 140–142° (from isopropanol), and from 7.3 g. 2-[p-(1-pyrryl)-phenyl]butyric methylester and 50 ml. 2-piperidino ethanol the 2-[p-(1-pyrryl)-phenyl]-butyric acid - 2 - piperidino-ethylester, M.P. of hydrochloride 111–114° (from methylethylester).

The 2-[p-(1-pyrryl)-phenyl]-butyric acid-methylester which is used as starting material is prepared according to the following procedure:

(a) 179.0 g. 2-(p-aminophenyl)-butyric acid (Fourneau, Sandulesco, Bl. [4], 452) and 132.0 g. 2,5-dimethoxy-tetrahydrofuran are refluxed in 200 ml. glacial acetic acid for 30 minutes. Then the reaction mixture is distilled from an oil bath at the beginning under 12 torr and thereafter under high vacuum. The fraction which distils under 0.5–1 torr between 180–200° consists in crude 2-[p-(1-pyrryl)-phenyl]-butyric acid and crystallises in the course of the distillation, M.P. 105–110°. Recrystallisation from benzene-cyclohexane (1:1, 660 ml.) under discolouring with active carbon, washing of the crystals with the same solvent mixture (110 ml.) and drying for 15 hours at 50° under 0.5 torr yields the pure 2-[p-(1-pyrryl)-phenyl]-butyric acid, M.P. 112–113°.

(b) 11.5 g. 2-[p-(1-pyrryl)-phenyl]-butyric acid are refluxed in a solution of 2 ml. conc. sulfuric acid in 65 ml. methanol for 4 hours. Then the reaction mixture is cooled to 0° and poured on ice water. The crude 2-[p-

(1-pyrryl)-phenyl]-butyric acid-methylester which precipitates in crystal form is filtered off, washed with ice cold sodium carbonate solution and then with water and dried under vacuum at room temperature. After recrystallisation from methanol it melts at 56–58°.

EXAMPLE 9

Analogously to Example 3 are prepared by use of 50 ml. 2-(dimethylamino)-1-ethanol and 50 ml. toluene and 7.3 g. 2-[p-(1-pyrryl)-phenyl]-propionic acid-ethylester [see Example 4(a)–(d)] the 2 - [p-(1-pyrryl)-phenyl]-propionic acid-2-(dimethylamino)-ethylester, M.P. of the hydrochloride 141–144°.

EXAMPLE 10

According to Example 3 one obtains from 6.9 g. [p-(1-pyrryl)-phenyl]-acetic acid-ethylester [see Example 2(a)] and 50 ml. 1-dimethylamino-2-propanol the [p-(1-pyrryl)-phenyl]-acetic acid-2-(dimethylamino)-1-methylethylester, the hydrochloride of which melts at 167–170° (from isopropanol).

EXAMPLE 11

3.5 g. 2-[p-(1-pyrryl)-phenyl]-butyric acid (see Example 8(a)) and 6.3 g. 2,6-lutidine are dissolved in 30 ml. methylene chloride and to this reaction mixture is added at 10–20° a solution of 1.8 g. (1.1 ml.) thionylchloride in 10 ml. methylenechloride dropwise. Thereafter the reaction mixture is stirred for 1 hour at room temperature.

The resulting homogenous solution of the 2-[p-(1-pyrryl)-phenyl]-butyrylchloride is stirred with 2.7 g. 2-(dimethylamino)-ethanol for 14 hours at room temperature. After evaporation of the volatile parts, the residue is taken up in 100 ml. methylenechloride and shaken with 20 ml. saturated potassium carbonate solution. The methylenechloride extract is dried over magnesium sulfate, the solvent is evaporated and the remaining oil distilled in the bulb tube at 130–140° under 0.001 torr whereby one obtains the 2 - [p-(1-pyrryl)-phenyl]-butyric acid-2-(dimethylamino)-ethylester. It is converted with 1.1 ml. 4.6 N ethereal hydrogenchloride solution in the hydrochloride thereof, M.P. 152–156°, after recrystallisation from isopropanol M.P. 155–158°.

EXAMPLE 12

12.0 g. [p-(1-pyrryl)-phenyl]-acetic acid are dissolved in 150 ml. sec. butanol and refluxed with 7.8 g. freshly distilled 3-(dimethylamino)-propylchloride for 16 hours. After cooling of the solution and suction off of the precipitated crystals one obtains the [p-(1-pyrryl)-phenyl]-acetic acid - 3-(dimethylamino)-propylester-hydrochloride, M.P. 147–149°. On recrystallisation from chloroform-ether the melting point rises to 151–153°.

The [p-(1-pyrryl)-phenyl]-acetic acid which is necessary as starting material is prepared according to the following procedure:

(a) 30.2 g. (p-aminophenyl)-acetic acid (Radziszewski, Ber., 2, 209; Bedson, J. Chem. Soc., 37, 92) and 26.4 g. 2,5-dimethoxytetrahydrofurane are refluxed in 40 ml. glacial acetic acid for 30 minutes. After cooling the reaction solution is poured in 160 ml. water. The separated crystals are filtered off, washed with water and dried for 15 hours at 70°. The formed brown powder is extracted in a Soxhlet-apparatus with benzene. On evaporation of the extract one obtains the [p-(1-pyrryl)-phenyl]-acetic acid, M.P. 180–182°.

EXAMPLE 13

6.6 g. 1-[p-(1-pyrryl)-phenyl]-butyric acid (see Example 8(a)) and 3.9 g. freshly distilled 3-(dimethylamino)-propylchloride are refluxed in 150 ml. isopropanol for 16 hours. Then the isopropanol is evaporated under reduced pressure, the resulting oil dissolved in little isopropanol and added ether whereby the reaction product crystallises. After recrystallisation from isopropanol the hydrochloride of the 2-[p-(1-pyrryl)-phenyl]-butyric acid-3-(dimethylamino)-propylester melts at 140–142°.

EXAMPLE 14

According to Example 13 are prepared from 7.1 g. [p-(1-pyrryl)-phenyl]-acetic acid (see Example 12(a)) and 6.4 g. freshly distilled 2-(diethylamino)-ethylchloride the [p-(1-pyrryl)-phenyl]-acetic acid - 2 - (diethylamino)-ethylester and the hydrochloride thereof, M.P. 123–125° (from ethylacetate-ethanol).

EXAMPLE 15

3.0 g. sodium salt of the 2-[p-(1-pyrryl)-phenyl]-butyric acid are finely pulverised and refluxed while stirring with 2.0 g. 2-piperidinoethylchloride in 150 ml. toluene for 15 hours. The reaction mixture is cooled and extracted twice with each 10 ml. of water. The toluene phase is dried over sodium sulfate and evaporated in vacuum under 10–15 torr. The resulting oil is distilled in a bulb tube under 0.02 torr at 240–250° air bath temperature whereby the 2-[p-(1-pyrryl)-phenyl]-butyric acid-2-piperidinoethylester is obtained. This is dissolved in 10 ml. ether and then are added 4 ml. 2.8 N ethereal hydrogen chloride solution. The formed hydrochloride is filtered off and recrystallised from butanone. It melts at 111–114°.

The sodium salt which is necessary as starting material is prepared according to the following procedure:

(a) 11.5 g. 2-[p-(1-pyrryl)-phenyl]-butyric acid (see Example 8(a)) are stirred with a solution of 2.0 g. sodium hydroxide in approximately 200 ml. water until the acid is dissolved. The solution is filtrated to clearness and evaporated in the rotary evaporator under 12 torr. The such obtained crystalline sodium salt is dried for 8 hours at 90° under 100 torr. It can be used directly for the next reaction. After recrystallisation from isopropanol-water the sodium salt of the 2-[p-(1-pyrryl)-phenyl]-butyric acid melts at 271–274°.

EXAMPLE 16

An aqueous solution of 1.0 g. of succinaldehyde was first prepared by stirring an emulsion of 1.88 g. of 2,5-(diacetoxy)tetrahydrofuran in 10 ml. of 0.1 N hydrochloride acid at room temperature, until a homogeneous solution was obtained (about 15 minutes).

This solution of succinaldehyde was added in one portion to a solution of 2.22 g. of (4-aminophenyl)-acetic acid 2-(dimethylamino)-ethyl ester in 3 ml. of water and 14 ml. of dioxane. The resulting light tea-colored solution was kept under nitrogen in the dark at room temperature during 10 days. The solution was then cooled to $-10°$ and made alkaline by addition of 20 ml. of N NaOH at maximum 0°. The oil was separated three times with chloroform (25+25+15 ml.) and the combined chloroform extracts dried over magnesium sulphate. The solvent was removed by distillation under 10 mm., then the brown oily residue was distilled from an oil-bath of 172–213°. The distilled slightly yellow oil was dissolved in 20 ml. ether and the ethereal solution stirred at $-10°$ with 8.0 ml. N-hydrochloric acid. The aqueous solution was separated, brought to pH 8 with 3–5 ml. of cold 20% potassium hydrogen carbonate solution, and extracted with ether. The ethereal extract was dried with magnesium sulphate and evaporated to dryness. The remaining oil was dissolved in 6 ml. of isopropanol and 2.0 ml. of 1.28 N ethereal hydrogen chloride was added with stirring. The resulting clear yellow solution was seeded with the hydrochloride of [4-(1-pyrrolyl)-phenyl]-acetic acid 2-(dimethylamino)-ethyl ester and left standing at 4–5° overnight. The precipitate of the hydrochloride was isolated by filtration, washing with cold isopropanol ether (3:1) and drying (100°, 0.7 torr, 3 hours). The melting point in an evacuated tube was 156–158°. Crystallisation from 20 ml. isopropanol ether (2:1) raises melting point to 159–161°.

EXAMPLE 17

A solution of 1 g. succinaldehyde in acetic acid was prepared as described in the above experiment. A solution of 1.89 g. of (4-aminophenyl)-acetic acid 2-(dimethylamino)-ethyl ester in 4 ml. acetic acid was added and the resulting clear solution left standing at room temperature during 5 days. The clear, dark brown reaction mixture was evaporated to dryness from a water bath (85°) under reduced pressure. The oily residue was dissolved in 25 ml. of chloroform, the chloroform solution cooled to −20° and shaken, first with anhydrous sodium carbonate, then with magnesium sulphate. The solvent was removed by distillation under 10 torr, then the oily residue was distilled under 0.1 torr. Two fractions were isolated, the first boiling at 68–149°, the second boiling at 147–190°. The first reaction was dissolved in 10 ml. of ether of 0° and the ethereal solution shaken with 4.0 ml. of cold 2 N hydrochloric acid. The aqueous solution was separated, brought to pH 8 with 5–7 ml. cold 20% potassium hydrogen carbonate solution, and extracted with ether. The ethereal extract was dried with magnesium sulphate and evaporated to dryness. The remaining oil was dissolved in 10 ml. of ether and 1.0 ml. of N ethereal hydrogen chloride was added and the resulting precipitate of the hydrochloride of [4-(1-pyrrolyl)-phenyl]-acetic acid-2-(dimethylamino)-ethyl ester isolated by filtration, washing with 4 ml. of ether, and drying (50°, 0.5 torr). M.P. 159–161°.

EXAMPLE 18

2.22 g. of (4-aminophenyl)-acetic acid 2 - (dimethylamino)-ethyl ester, 1.88 g. of 2,5-(diacetoxy)-tetrahydrofuran, and 20 ml. of acetic acid were mixed and heated under reflux during 40 minutes. The clear, dark brown reaction mixture was evaporated to dryness from a water bath (100°) under reduced pressure (10 torr). The oily residue was distilled from an oil-bath of 167–215°. The distilled slightly yellow oil was dissolved in 20 ml. ether of 0° and worked up as described in the preceding experiment. The crude hydrochloride of [4-(1-pyrryl)-phenyl]-acetic acid 2-dimethylamino-ethyl ester was hereby obtained as a grey powder. Crystallisation from methanol isopropanol (1:2) and then from isopropanol ether (2:1) gave the hydrochloride, melting point an evacuated tube 159–161°.

EXAMPLE 19

Analyogously to Example 3, from 3.2 g. of [3-bromo-4-(2-pyrryl)-phenyl]-acetic acid ethyl ester, 1.0 g. of 2-dimethylamino ethanol, 25 mg. of sodium and 50 ml. of toluene is produced the [3-bromo-4-(1-pyrryl)-phenyl]-acetic acid-2-dimethylamino ethyl ester, which distils in the bulb tube at 150–170°/0.1 torr. Its hydrochloride melts at 158–160° (from isopropanol).

The [3-bromo-4-(1-pyrryl)-phenyl]-acetic acid ethyl ester is produced as follows:

From 4-amino-3-bromophenyl-acetic acid (cp. S. Gabriel, Ber., 15, 834 (1882)) the corresponding ethyl ester with hydrogen chloride is produced, B.P. 120–130°/0.01 torr.

A solution of 15.0 g. (4-amino-3-bromophenyl)-acetic acid ethyl ester, 7.7 g. 2,5-dimethoxytetrahydrofuran and 0.38 g. p-toluene sulfonic acid in 150 ml. acetonitrile is stirred into an oil bath of 140°. Immediately it is cooled in an ice bath and evaporated in a rotary evaporator. The dark oily residue is dissolved in 200 ml. ether. The ether solution is shaken with 20 ml. of saturated potassium bicarbonate solution, dried with magnesium sulfate and evaporated to dryness. The resulting dark brown oil is distilled in a bulb tube to 120–130° bath temperature and 0.02 torr. The [3-bromo-4-(1-pyrryl)-phenyl]-acetic acid ethyl ester is obtained as a colourless oil which crystallises after some time. After recrystallisation from ethanol, the ester is obtained as colourless needles, M.P. 141–143°.

EXAMPLE 20

From 6.9 g. of [p-(1-pyrryl)-phenyl]-acetic acid ethyl ester and 50 ml. of toluene is produced, analogously to Example 3, the [p-(1-pyrrol)-phenyl]-acetic acid-2-(1-pyrrolidinyl)-ethyl ester (7.1 g.). This boils in the bulb tube at 150–160°/0.01 torr. Its hydrochloride melts at 155–158° (from chloroform/ether).

EXAMPLE 21

8.5 g. of 2 - [3 - chloro - 4 - (1 - pyrryl) - phenyl]-propionic acid ethyl ester (see Example 5(f)) with a solution of 80 mg. of sodium in 50 ml. of 1-dimethylamino-2-propanol, 100 ml. of toluene and 150 ml. of xylene mixture are partially refluxed on a 20 cm. long Vigreux column, so that the toluene can thus slowly distil off (bath temperature 140–160°). The mixture is then refluxed overnight and subsequently, with removal of the column, approximately half the xylene is distilled off. In the remaining reaction mixture, the originally introduced sodium is neutralised by addition of 0.75 ml. of 4.5 N ethereal hydrochloric acid, the precipitate is filtered off and the residue firstly distilled under 10–12 torr and then under 0.1 torr. The fraction boiling at 160–170° bath temperature contains the 2-[3-chloro-4-(1-pyrryl)-phenyl]-propionic acid - (2 - dimethylamino - 1 - methyl)-ethyl ester as a yellow oil. It is dissolved in 100 ml. of ether and mixed with ethereal hydrochloric acid to the extent that the solution exhibits a clear acid reaction. The initially oily precipitating hydrochloride gradually crystallises.

By crystallising twice from absolute alcohol, the pure 2 - [3 - chloro - 4 - (1 - pyrryl) - phenyl] - propionic acid - (2 - dimethylamino - 1 - methyl) - ethyl ester hydrochloride, M.P. 186–188°, is obtained.

EXAMPLE 22

0.5 g. of clean, finely cut sodium is dissolved in a mixture of 250 ml. of toluene and 26.3 g. of 1-dimethylamino-2-propanol. To this is then added the solution of 57.5 g. of p-(1-pyrryl)-phenylacetic acid ethyl ester in 250 ml. of toluene. The somewhat cloudy solution is heated, with magnetic stirring, on a Vigreux column in such a way that the temperature at the head of the column is 60–90°, whereby the constituents lighter than toluene can be distilled off through the descending condenser.

The reaction mixture is kept boiling in this manner for 20–24 hours. The bath temperature is then increased by 10–20°, so that also the toluene is partially distilled off. The solution which remains is cooled and mixed, while vigorously stirring, with the equivalent amount of ethereal hydrochloric acid, corresponding to the sodium, e.g. 4.9 ml. of 4.5 N ethereal hydrochloric acid. The obtained fine precipitate is filtered off and the filtrate concentrated by evaporation on the rotary evaporator under 10–20 torr. As residue is obtained a brown, clear oil. This is subjected to a short-path distillation treatment, e.g. a bulb-tube distillation, bath temperature 160–180°/0.01 torr.

61.4 g. of p - (1 - pyrryl) - phenylacetic acid - 2 - (dimethylamino)-1-methylester are distilled as a slightly yellowish oil which, after a short time, solidifies to form a crystalline material.

42.0 g. are dissolved in 150 ml. of anhydrous ether and, while stirring, the solution is mixed dropwise with a mixture of 33 ml. of 4.5 N ethereal hydrocholric acid and 100 ml. of anhydrous ether. If necessary, the inside temperature is maintained at 25° by ice cooling. After all the hydrochloric acid has been added dropwise, the pasty reaction mixture is further stirred for 10–15 minutes. If the reaction mixture still shows no acid reaction, the pH is adjusted to 2–4 by a further addition of some ethereal hydrochloric acid.

The precipitate is now filtered with suction and washed twice with ether, using 50 ml. each time, and is dried at 50° in a vacuum drying cupboard. Colourless crystals are obtained, M.P. 162–170°. After recrystallisation from absolute alcohol, the hydrochloride melts at 167–170°.

EXAMPLE 23

4.8 g. of (p - aminophenyl) - acetic acid - (2 - dimethylamino-1-methyl)-ethyl ester are refluxed in 50 ml. of glacial acetic acid with 2.7 g. of 2,5-dimethoxy-tetrahydrofuran for 30 minutes. The reaction mixture is then concentrated by evaporation under ca. 20 torr. The residue remaining behind is distilled in a bulb tube at 200° and under 0.01 torr. The obtained oil is dissolved in 40 ml. of ether and is converted with 3.9 ml. of 3.6 N ethereal hydrochloric acid into the hydrochloride. After recrystallisation from isopropanol and then from absolute alcohol, the [p - (1 - pyrryl) - phenyl] - acitic acid - 2 - (dimethylamino)-1-methyl-ethyl ester is obtained as hydrochloride, M.P. 167–170°.

In an analogous manner, is obtained, using (a) 5.0 g. of (p-aminophenyl)-acetic acid-2-(1-pyrrolidinyl)-ethyl ester, the [p-(1-pyrryl)-phenyl]-acetic acid-2-(1-pyrrolidinyl)-ethyl ester, as well as its hydrochloride, M.P. 155–158° (from chloroform/ether), using (b) 5.3 g. of (p-aminophenyl)-acetic acid-2-morpholino-ethyl ester, the [p-(1-pyrryl)-phenyl]-acetic acid-2-morpholino-ethyl ester, as well as its hydrochloride, M.P. 156–160° (from chloroform/isopropanol), using (c) 4.8 g. of (p-aminophenyl)-acetic acid-3-(dimethylamino)-propyl ester, the [p-(1-p-(1-pyrryl)-phenyl]-acetic acid-3-(dimethylamino)-propyl ester, as well as its hydrochloride, M.P. 151–153° (from chloroform/ether), using (d) 5.3 g. of (p-aminophenyl)-acetic acid-3-(1-pyrrolidinyl)-propyl-ester, the [p-(1-pyrryl)-phenyl]-acetic acid-3-1-pyrrolidinyl)-propyl ester, as well as its hydrochloride, M.P. 108–111°) from carbon tetrachloride/chloroform/isopropanol).

The (p - aminophenyl) - acetic acid - (aminoalkyl)-esters, which are required as starting material, are produced analogously to Example 1(a).

From 6.3 g. of (p-aminophenyl)-acetic acid ethyl ester and 30 ml. of 1-dimethylamino-2-propanol is thus obtained the (p-aminophenyl)-acetic acid - 2 - (dimethylamino)-1-methyl-ethyl ester as a light-yellow oil, M.P. 180–190°/0.01 torr (bulb tube).

The following are obtained in an analogous manner:

($a_1$) The (p - aminophenyl) - acetic acid - 2 - (1-pyrrolidinyl)-ethyl ester, M.P. 190–200°/0.01 torr, using 20 ml. of 2-(1-pyrrolidinyl)-ethanol, ($b_1$) The (p - aminophenyl) - acetic acid - 2 - morpholino-ethyl ester, M.P. 200–205°/0.01 torr, using 20 ml. of 2-morpholino-ethanol.

($c_1$) The (p - aminophenyl) - acetic acid - 3 - (dimethylamino)-propyl ester, M.P. 190–205°/0.01 torr, using 30 ml. of 3-(dimethylamino)-propanol, ($d_1$) The (p - aminophenyl) - acetic acid - 3 - (1-pyrrolidinyl)-propyl ester, M.P. 200–210°/0.01 torr, using 20 ml. of 3-(1-pyrrolidinyl)-propanol.

EXAMPLE 24

From 3.8 g. of 2-(p-aminophenyl)propionic acid-2-dimethylamino-ethyl ester and 2.1 g. of 2,5-dimethoxy tetrahydrofuran in 40 ml. of glacial acetic acid is produced, analogously to Example 23, the 2-[p-(1-pyrryl)-phenyl]-propionic acid-2-(dimethylamino)-ethyl ester and its hydrochloride, M.P. 141–144° (from absolute ethanol).

The required starting material is produced as follows:

(a) Hydrochloric acid gas is introduced, while refluxing during 18–24 hours, into a solution of 21.0 g. of 2-(p-aminophenyl)-propionic acid (F. Nerdel et al., Chem. Ber., 87, 217 (1954)) in 300 ml. of absolute ethanol. The reaction mixture is then concentrated by evaporation under reduced pressure. The concentrated residue is taken up in 40 ml. of ice water and, while cooling with ice, made alkaline with concentrated potassium hydroxide solution. The liberated base is immediately extracted with 300 ml. of ether, the ether solution is washed with 20 ml. of water and dried over magnesium sulphate. After evaporation of the ether, an oil remains behind, which is distilled at 130° bath temperature and under 0.01 torr in a bulb tube. The thus obtained 2-(p-aminophenyl)-propionic acid ethyl ester (19.2 g.) solidifies while cooling in ice and, without further purification, it is used for the next reaction.

(b) From 16.0 g. of 2-(p-amino-phenyl)-propionic acid ethyl ester and 70 ml. of 2-(dimethylamino)-ethanol is produced, analogously to Example 1(a), the 2-(p-aminophenyl)-propionic acid - 2 - (dimethylamino)-ethyl ester, M.P. 180–195°/0.01 torr (bulb tube).

EXAMPLE 25

From 3.95 g. of (4-amino-3-chloro-phenyl)-acetic acid-2-(dimethylamino)-ethyl ester are produced, analogously to Example 24, the [3-chloro-4-(1-pyrryl)-phenyl]-acetic acid-2-dimethylamino-ethyl ester (B.P. 170–180°/0.001 torr in the bulb tube) and its fumarate, M.P. 119–120° (from absolute ethanol).

The required starting material is obtained by reacting 12.0 g. of (4-amino-3-chloro-phenyl)-acetic acid-ethyl ester (cp. Example 5(a)) analogously to Example 1(a). The obtained (4-amino-3-chloro-phenyl)-acetic acid-2-(dimethylamino)-ethyl ester, an almost colourless oil, boils in the bulb tube under 0.01 torr at 195–210° bath temperature.

EXAMPLE 26

From 5.6 g. of 2-(4-amino-3-chloro-phenyl)-propionic acid-2-(dimethylamino)-ethyl ester and 2.8 g. of 2.5-dimethoxy-tetrahydrofuran are produced, analogously to Example 24, the 2-[3-chloro-4-(1-pyrryl)-phenyl]-propionic acid-2-(dimethylamino)-ethyl ester (M.P. in the bulb tube 130–140°/0.001 torr, $n_D^{21}=1.5518$) and its fumarate (M.P. 158–159°; from methanol/ether).

The ester, which is required as starting material, is produced as follows:

(a) 31.2 g. of methyl-malonic acid diethyl ester are dissolved, with the exclusion of moisture, in 100 ml. of dimethyl formamide. The solution is mixed in portions, while cooling with ice water, with 8.6 g. of sodium hydride dispersion (50% in oil), whereby the temperature remains continually below 40°. After completion of the addition, the mixture is heated to 70–80° and 28.8 g. of 2,4-dichloro-nitrobenzene, dissolved in 50 ml. of dimethyl formamide, are quickly added dropwise. The reaction mixture changes colour and reacts slightly exothermically, so that the heating can be temporarily removed. After the addition has been made, the mixture is further stirred for 16 hours at 80°, then cooled and the reaction mixture is poured on to 2000 ml. of water. The emulsion is extracted three times with ether using 500 ml. of ether each time. The ether extracts are washed with water 3 times using 500 ml. each time, and once with 40 ml. of sodium chloride solution, after which they are combined, dried and concentrated by evaporation. The residue, 54.3 g. of orange-coloured oil, is allowed to stand for some time in a small separating funnel, whereby the mineral oil of the sodium hydride dispersion precipitates at the top and can be separated. By distillation in the bulb tube of the crude product, 31.2 g. of (3-chloro-4-nitro-phenyl)-methyl-malonic acid diethyl ester are obtained as a light-yellow oil, B.P.$_{0.001}$=125–140°.

(b) 17.5 g. of (3-chloro-4-nitrophenyl)-methyl-malonic acid diethyl ester, dissolved in 100 ml. of dioxane, are hydrogenated with the addition of 4 g. of Raney-nickel under normal pressure and at room temperature.

If the hydrogenation prematurely ceases, further amounts of catalyst must be added. After hydrogenation, the catalyst is filtered off and the mixture subsequently washed with dioxane. The filtrates are combined and concentrated by evaporation in a rotary evaporator. The residue is taken up in 100 ml. of ether and washed twice with 20 ml. of water and once with 15 ml. of concentrated sodium chloride solution. After drying and concentration of the ether extracts by evaporation, 14.8 g. of light-green oil are obtained. From distillation in the bulb tube are obtained 9.5 g. of (3-chloro-4-amino-phenyl)-methyl-malonic acid diethyl ester, B.P.$_{0.05}$=160–170.°

(c) 3.1 g. of sodium metal are dissolved, with exclusion of moisture, in 300 ml. of absolute alcohol and a solution of 30 g. of (4-amino-3-chloro-phenyl)methyl-malonic acid diethyl ester in 200 ml. abs. alcohol is then added. The mixture is refluxed for 22 hours, then cooled and the alcohol evaporated off. Ice and water are added and the solution is adjusted to a pH value of 1–2 using 5 N hydrochloric acid. Ether is added, the solution is thoroughly shaken and the layer of hydrochloric acid separated. The ether layers are extracted 6 times using each time 100 ml. of 1 N hydrochloric acid. The hydrochloric acid extracts are combined, adjusted to pH 8–9 with sodium hydroxide solution and extracted with ether. After washing, drying and concentration of the ether extracts by evaporation, 9 g. of 2-(4-amino-3-chloro-phenyl)-propionic acid ethyl ester are obtained, which are distilled in the bulb tube at 103–110°/0.01 torr. Their hydrochloride melts at 156–158° (from isopropanol).

EXAMPLE 27

From 22.9 g. of [p-(1-pyrryl)-phenyl]-acetic acid ethyl ester and 12.7 g. of 2-(1-pyrrolidinyl)-ethanol, is produced analogously to Example 22, using 100 ml. of toluene and 150 mg. of sodium, the [p-(1-pyrryl)-phenyl]-acetic acid-2-(1-pyrrolidinyl)-ethyl ester (B.P. 180°/0.003 torr; M.P. of the hydrochloride 155–158° (from abs. alcohol)).

EXAMPLE 28

3.5 g. of [p-(1-pyrryl)-phenyl]-acetic acid (cp. Example 12(a)) and 6.7 g. of 2-(dimethylamino)-ethanol, dissolved in 50 ml. of methylene chloride, are mixed in the course of 5 minutes at 0–5°, while cooling with ice, with 1.1 ml. of thionyl chloride. The reaction mixture is stirred over night at ca. 20°, then washed with 20 ml. of 10% potassium carbonate solution and dried over magnesium sulphate. The solution is concentrated by evaporation and the residue distilled in the bulb tube. The fraction obtained at 120–130°/0.001 torr, is the [p-(1-pyrryl)-phenyl]-acetic acid-2 - (dimethylamino)-ethyl ester. Its hydrochloride melts at 159–161° (from abs. ethanol).

In an analogous manner is obtained, using 7.7 g. of 1-(dimethylamino)-2-propanol, the [p-(1-pyrryl)-phenyl]-acetic acid-2-(dimethylamino)-1-methyl-ethyl ester (B.P. 120–130°/0.001 torr in the bulb tube, M.P. of the hydrochloride 167–170° (from absolute ethanol).

EXAMPLE 29

11.4 g. of [p-(1-pyrryl)-phenyl]-acetic acid ethyl ester, dissolved in 200 ml. of toluene, and 0.10 g. of sodium, dissolved in 50 ml. of 2-(di-n-butylamino)-ethanol, are heated on a 20 cm. long Vigreux column, whereby the toluene is slowly distilled off. This process is repeated with a further 200 ml. of toluene. The sodium is then neutralised by the addition of 1.0 ml. of 4.5 N ethereal hydrochloric acid. The toluene is now distilled off completely in a rotary evaporator. The residue is distilled in a bulb tube. The excess dibutylamino-ethanol boils at 130° bath temperautre under 11 torr. At 150–160°/0.002 torr is distilled the [p-(1-pyrryl)-phenyl]-acetic acid-2-(di-n-butylamino)-ethyl ester, $n_D^{22}$=1.530; M.P. of the fumarate is 124–126° (from ethanol).

EXAMPLE 30

6.1 g. of [p-(1-pyrryl)-phenyl]-acetic acid (cp. Example 12(a)) and 4.3 g. of 2-(dimethylamino)-ethyl chloride (freshly distilled) are refluxed in 40 ml. of isopropanol for 18 hours. The isopropanol is then evaporated off under reduced pressure and the concentrated residue distribtued between 15 ml. of ice-cold, saturated potash solution and 80 ml. of ether. The ether phase is washed with 5 ml. of water, dried over magnesium sulphate and concentrated by evaporation. By distillation of the residue in a bulb tube at 130° bath temperature and under 0.01 torr, 2.4 g. of [p-(1-pyrryl)-phenyl]-acetic acid-2-(dimethylamino)-ethyl ester are obtained, the hydrochloride of which melts at 159–161° (from isopropanol/ether).

The following derivatives are produced in an analogous manner:

(a) The 2-[p-(1-pyrryl)-phenyl]-propionic acid-2-(dimethylamino)-ethyl ester (B.P. 130–140°/0.001 torr, M.P. of the hydrochloride 141–144° (from abs. ethanol), using 6.5 g. of 2-[p-(1-pyrryl)-phenyl]-propionic acid (cp. Example 4(c)).

(b) 2.1 g. of 2-[p-(1-pyrryl)-phenyl]-butyric acid-2-(dimethylamino)-ethyl ester (M.P. of the hydrochloride 155–158° (from isopropanol)), using 6.9 g. of 2-[p-(1-pyrryl)-phenyl]-butyric acid (cp. Example 8(a)).

(c) The [3-chloro-4-(1-pyrryl)-phenyl]-acetic acid-2-(dimethylamino)-ethyl ester (B.P. 170–190°/0.004 torr in the bulb tube, M.P. of the fumarate 119–120° (from methanol/ether)), using 7.0 g. of [3-chloro-4-(1-pyrryl)-phenyl]-acetic acid (produced by hydrolysis of its ethyl ester, cp. Example 5(b), M.P. 75–76°).

(d) The 2-[3-chloro-4-(1-pyrryl) - phenyl]-propionic acid-2-(dimethylamino)-ethyl ester (B.P. 150–160°/0.001 torr in the bulb tube, M.P. of the fumarate 158–159° (from methanol/ether)), using 7.45 g. of 2-[3-chloro-4-(1-pyrryl)-phenyl]-propionic acid (cp. Example 5(e)).

EXAMPLE 31

6.0 g. of [p-(1-pyrryl)-phenyl]-acetic acid (cp. Example 12(a)) and 5.4 g. of 2-(1-pyrrolidinyl)-ethyl chloride are reacted analogously to Example 30. The [p-(1-pyrryl)-phenyl]-acetic acid-2-(1-pyrrolidinyl)-ethyl ester is thus obtained, the hydrochloride of which melts at 155–158° (from absolute alcohol).

Obtained analogously, using 5.6 g. of 3-(1-pyrrolidinyl)-propyl chloride, is the [p-(1-pyrryl)-phenyl]-acetic acid-3-(1-pyrrolidinyl)-propyl ester as hydrochloride, M.P. 108–111° (from chloroform/ether).

EXAMPLE 32

From 3.5 g. of [p-(1-pyrryl)-phenyl]-acetic acid and 3.1 g. of 2-morpholino-ethyl chloride in 60 ml. of sec. butanol is obtained, analogously to Example 30, the [p-(1-pyrryl)-phenyl]-acetic acid - 2-morpholino-ethyl ester, which boils at 140–150°/0.002 torr in the bulb tube. Its hydrochloride melts at 157–160° (from absolute ethanol).

EXAMPLE 33

3.5 g. of [p-(1-pyrryl)-phenyl]-acetic acid, dissolved in 20 ml. of dimethyl sulphoxide are mixed in portions with 0.4 g. of sodium hydride (as 50% dispersion in mineral oil) and stirred for 1 hour at 20°. To this is then added 1.9 g. of 2-dimethylamino-ethyl chloride and the mixture is stirred for 3 hours at room temperature. The solvent is then evaporated off at 100°/10 torr. The residue is taken up in 80 ml. of ether and washed with 20 ml. of saturated potassium carbonate solution. The organic phase is separated, dried over magnesium and concentrated by evaporation. The concentrated residue is dissolved in 10 ml. of ester and mixed dropwise with ethereal hydrochloric acid until the reaction mixture shows an acid reaction (ca. pH 2–3). The obtained precipitate [p-(1 - pyrryl)- phenyl]-acetic acid - 2 - dimethylamino-ethyl ester hydrochloride is recrystallised from absolute alcohol and then melts at 159–161°.

EXAMPLE 34

A mixture of 3.0 g. of [p-(1-pyrryl)-phenyl]-acetic acid, 2.1 g. of 1-(dimethylamino)-2-propanol, 180 ml. of toluene and 4.7 g. of p-toluene sulphonic acid is refluxed for 20 hours in the water separator. The reaction mixture is then concentrated in a bath of 50° under 12 torr. The residue is thoroughly shaken with ca. 20 g. of ice, 20 ml. of concentrated potassium hydroxide solution and 100 ml. of ether. The ether phase is separated, dried over potash and concentrated by evaporation. The concentrated residue is distilled in a bulb tube at 130–140°/0.003 torr and yields the [p-(1-pyrryl)-phenyl]-acetic acid-(1-methyl-2-dimethylamino)-ethyl ester. Its hydrochloride melts at 167–170° (from absolute alcohol).

In an analogous manner is produced from 4.6 g. of 2-[p-(1-pyrryl)-phenyl]-butyric acid, 2.1 g. of 3-(dimethylamino)-1-propanol, 4.2 g. of p-toluene sulpho acid and 180 ml. of toluene, the 2-[p-(1-pyrryl)-phenyl]-butyric acid-(3-dimethylamino)-propyl ester. Its hydrochloride melts at 140–142° (from abs. alcohol).

EXAMPLE 35

A solution of 4.0 g. of [p-(1-pyrryl)-phenyl]-acetic acid and 4.9 g. of 1-(dimethylamino)-2-chloropropane in 100 ml. of secondary butanol is refluxed for 20 hours. After the butanol has been evaporated off at reduced pressure, the residue is taken up in 10 ml. of ice water, made alkaline with 2 ml. of concentrated potassium hydroxide solution and is immediately extracted with 100 ml. of ether. The ether solution is separated, washed with 5 ml. of ice water and dried over potash. The residue remaining after the ether has been evaporated off is distilled in a bulb tube at 130–140° under 0.002 torr and, following this, it is chromatographed on 300 g. of silica gel. The column is eluted with a mixture of 4 parts of benzene and 1 part of methanol and 30 ml. fractions are collected. The fractions 8–12 contain the [p-(1-pyrryl)-phenyl]-acetic acid-(1-methyl-2-dimethylamino)-ethyl ester, the hydrochloride of which melts at 167–170° (from abs. ethanol).

The fractions 14–18 contain the isomeric [p-(1-pyrryl)-phenyl]-acetic acid-2-(dimethylamino)-propyl ester, the hydrochloride of which melts at 135–137° (from absolute ethanol).

In the following there are given some methods for the preparation of different application forms:

EXAMPLE 36

500.0 g. active ingredient, e.g. 2-[p-(1-pyrryl)-phenyl]-propionic acid-2 - (dimethylamino)-ethylester-hydrochloride are mixed with 550.0 g. lactose and 292.0 g. potato starch. The mixture is moistened with an alcoholic solution of 8.0 g. gelatine and granulated through a sieve. After drying, one mixes to 60.0 g. potato starch, 60.0 g. talc, 10.0 g. magnesium stearate and 20.0 g. high dispersed silicon dioxide. The mixture is pressed to 10,000 tablets, each of which shows a weight of 150 mg. and contains 50 mg. active ingredient. The tablets may be scored to permit administration of fractional doses.

EXAMPLE 37

From 250.0 g. active ingredient, e.g. [p-(1 - pyrryl)-phenyl]-acetic acid - 2 - (dimethylamino)-ethylester-hydrochloride, 175.90 g. lactose and the alcoholic solution of 10 g. stearic acid, a granulate is prepared which is mixed after drying with 56.60 g. highly dispersed silicon dioxide, 165.0 g. talc, 20.0 g. potato starch and 2.50 g. magnesium stearate and pressed into 10,000 dragée cores. These are coated with a concentrated syrup from 502.28 g. crystallised saccharose, 6.0 g. shellac, 10.0 g. arabic gum, 0.22 g. pigment and 1.5 g. titandioxide and dried. The obtained drageés weigh each 120 mg. and contain each 25 mg. active ingredient.

EXAMPLE 38

To prepare 1000 capsules, each containing 25 mg. active ingredient, 25 g. [p-(1-pyrryl)-phenyl]-acetic acid-1-methyl - 3-(dimethylamino)-ethylester-hydrochloride are mixed with 248.0 g. lactose. The mixture is moistened homogeneously with an aqueous solution of 2.0 g. gelatine and granulated through a suitable sieve (e.g. sieve III according to Ph. Helv. V). The granulate is mixed together with 10.0 g. dried corn starch and 15.0 g. talc and filled homogeneously in 1000 hard gelatine capsules of size 1.

EXAMPLE 39

A suppository mass is prepared from 5.0 g. [p-(1-pyrryl)-phenyl]-acetic acid - 2 - (dimethylamino)-ethylester-hydrochloride and 163–5 g. adeps sodilus. This mass is casted into 100 suppositories, each of which contain 50 mg. active ingredient.

What we claim is:
1. A compound of the formula

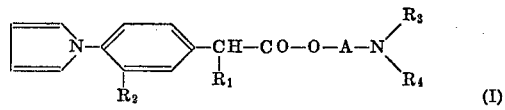

wherein
$R_1$ is hydrogen, methyl or ethyl,
$R_2$ is hydrogen or halogen up to the atomic number 35,
$R_3$ and $R_4$ independent of each other are alkyl having at most 4 carbon atoms or together with the adjacent nitrogen atom form the pyrrolidinyl, piperidino, hexahydro-1H-azepine-1-yl or the morpholino group, and
A is alkylene having 2 or 3 carbon atoms with at least 2 carbon atoms between the oxygen and nitrogen atom;

and the pharmaceutically acceptable acid addition salts thereof.

2. A compound according to claim 1, wherein
$R_1$ is hydrogen or methyl,
$R_2$ is hydrogen or chloro,
$R_3$ and $R_4$ independent of each other are methyl or together with the adjacent nitrogen form the pyrrolidinyl or the morpholino group, and
A is as defined in claim 1, and the pharmaceutically acceptable acid addition salts thereof.

3. A compound according to claim 1, which is [p-(1-pyrryl)-phenyl]-acetic acid-[3-(1 - pyrrolidinyl)-propyl]-ester and the pharmaceutically acceptable acid addition salts thereof.

4. A compound according to claim 1, which is [p-(1-pyrryl)-phenyl]-acetic acid-2-morpholinoethyl ester and the pharmaceutically acceptable acid addition salts thereof.

5. A compound according to claim 1, which is [p-(1-pyrryl)-phenyl]-acetic acid-3-(dimethylamino)-propyl ester and the pharmaceutically acceptable acid addition salts thereof.

6. A compound according to claim 1 which is 2[p-(1-pyrryl) - phenyl]-propionic acid-2-(dimethylamino)-ethyl ester and the pharmaceutically acceptable acid addition salts thereof.

7. A compound according to claim 1, which is 2-[3-chloro-4-(1-pyrryl) - phenyl]-propionic acid-2-(dimethylamino)-ethyl ester and the pharmaceutically acceptable acid addition salts thereof.

8. A compound according to claim 1, which is [3-chloro-4-(1-pyrryl) - phenyl]-acetic acid-2 - (dimethylamino)-ethyl ester and the pharmaceutically acceptable acid addition salts thereof.

9. A compound according to claim 1, which is [p-(1-pyrryl)-phenyl]-acetic acid-2-(dimethylamino)-1-methyl-ethyl ester and the pharmaceutically acceptable acid addition salts thereof.

10. A compound according to claim 1, which is [p-(1-pyrryl)-phenyl]-acetic acid-2-(1 - pyrrolidinyl)-ethyl ester and the pharmaceutically acceptable acid addition salts thereof.

11. A compound according to claim 1, which is [p-(1-pyrryl)-phenyl]-acetic acid - 2 - (dimethylamino)-ethyl ester and the pharmaceutically acceptable acid addition salts thereof.

References Cited

UNITED STATES PATENTS 3,151,121  9/1964  Karmas _____ 260—326.3 X

ALEX MAZEL, Primary Examiner

J. A. NARCAVAGE, Assistant Examiner

U.S. Cl. X.R.

260—239 BF, 247.2 B, 293.71, 293.87, 471 R; 424—244, 248, 267, 274